United States Patent [19]
DiFrank et al.

[11] Patent Number: 6,151,918
[45] Date of Patent: Nov. 28, 2000

[54] FOREHEARTH FEEDER TUBE LIFT SYSTEM

[75] Inventors: Frank J. DiFrank, Toledo; D. Wayne Leidy, Perrysburg; William B. Rugh, Waterville, all of Ohio

[73] Assignee: Owens-Brockway Glass Container Inc., Toledo, Ohio

[21] Appl. No.: 09/130,313

[22] Filed: Aug. 7, 1998

[51] Int. Cl.[7] .............................. A44B 21/00; C03B 5/18; C03B 5/26
[52] U.S. Cl. ............................... 65/172; 65/325; 65/331; 65/355; 292/46; 292/256.69; 292/257
[58] Field of Search ............................... 65/27, 159, 170, 65/171, 172, 173, 324, 325, 326, 328, 329, 330, 331, 355, 356; 292/46, 256.69, 257

[56] References Cited

U.S. PATENT DOCUMENTS

| | | | |
|---|---|---|---|
| 1,532,514 | 4/1925 | Raynes | 65/172 |
| 1,760,254 | 5/1930 | Peiler | 65/171 |
| 1,843,248 | 2/1932 | Soubier | 65/129 |
| 1,852,218 | 4/1932 | Peiler | 65/129 |
| 3,239,326 | 3/1966 | Tyner | 65/330 |
| 4,478,631 | 10/1984 | Mumford | 65/327 |
| 4,514,209 | 4/1985 | Mumford | 65/328 |
| 4,551,163 | 11/1985 | Duga et al. | 65/129 |
| 5,660,610 | 8/1997 | DiFrank et al. | 65/158 |
| 5,693,114 | 12/1997 | Scott | 65/328 |
| 5,718,741 | 2/1998 | Hull et al. | 65/346 |

Primary Examiner—Sean Vincent

[57] ABSTRACT

A feeder tube assembly for a feeder bowl of a glass melting furnace forehearth. The feeder tube assembly has an horizontally extending elongate support arm, and a feeder tube that is carried by the support arm at a location near an end of the support arm. The feeder tube is rotatable about its longitudinal central axis with respect to the support arm, and the support arm carries drive elements for rotating the feeder tube about its longitudinal central axis. The support arm is supported on a vertically extending servo motor actuated linear actuator, and the elevation of the support arm is adjustable by actuation of the linear actuator, a releasable brake being provided to prevent rotation of the servo motor when it is desired to prevent a change in elevation of the support arm. The position of the support arm relative to the linear actuator is independently adjustable both longitudinally of the support arm and transversely of the support arm, and the support arm is rotatable with respect to the linear actuator when it is desired to replace a feeder tube carried thereby or the feeder bowl directly below it.

19 Claims, 11 Drawing Sheets

FOREHEARTH FEEDER TUBE LIFT SYSTEM

FIELD OF THE INVENTION

This invention relates to a feeder tube assembly for a feeder bowl of a glass melting furnace forehearth. More particularly, this invention relates to a lift mechanism for adjustably supporting a forehearth feeder tube during its operation, and for lifting the feeder tube from its operating position during the removal of the feeder tube for replacement of the feeder tube or replacement of the feeder bowl.

BACKGROUND OF THE INVENTION

U.S. Pat. No. 5,718,741 (Hull et al.), which is assigned to the assignee of this application, the disclosure of which is incorporated herein by reference, discloses a forehearth for cooling a stream of molten glass as it flows from a glass melting furnace to a forming machine for forming the molten glass into finished products, for example, hollow glass containers of the type widely used in packaging various food, beverage and other products. In the arrangement of the '741 Patent, and in a variety of other types of forehearths, molten glass flows downwardly through an opening, or a plurality of openings, in the bottom of a feeder bowl at an end of the forehearth that is remote from the end into which molten glass from the melting furnace flows.

To control the flow of molten glass from a forehearth feeder bowl, a vertically extending, refractory feeder tube is provided with its lowermost end immersed in the feeder bowl to a level slightly above the inside surface of the bottom of the feeder bowl and surrounding the opening(s) at the bottom of the feeder bowl, and the ceramic tube is caused to rotate slowly during the operation of the forehearth to ensure a proper mixing and temperature uniformity of the molten glass flowing from the feeder bowl. A feeder bowl refractory tube with a tube drive system of this general type is disclosed in U.S. Pat. No. 5,660,610 (DiFrank), which is also assigned to the assignee of this application, the disclosure of which is also incorporated by reference herein. Other glass forehearth feeder bowl feeder tube arrangements are described in U.S. Pat. Nos. 5,693,114 (Scott), 4,514,209 (Mumford) and 4,478,631 (Mumford), the disclosure of each of which is also incorporated by reference herein.

From time to time during the operation of a glass manufacturing system of a type employing a forehearth feeder bowl feeder tube of the type described above it is necessary to remove the feeder tube and/or the feeder bowl for repair or replacement. In the case of the replacement of the feeder bowl, the feeder tube must also be swung horizontally out of the way of the feeder bowl as well as being lifted vertically so that its lower edge clears the upper extent of the feeder bowl. It is also necessary from time to time to be able to adjust the height of the feeder tube. As a feeder tube of this type is quite massive, very large forces are required to lift it from its operating position. Heretofore, counterweighted lift mechanisms were employed for this purpose, and these mechanisms typically employed gear boxes with considerable backlash, thus making precise positioning and motions of the feeder tube very difficult. Moreover, in these arrangements, precise adjustment of the position of the feeder tube in a horizontal plane, in X and/or Y directions, was difficult to achieve in that the horizontal motions of the counterweight lift mechanisms could not be isolated along X or Y axes. Further, counterweighted lift mechanisms are cumbersome because of the dead weights employed in them, and the vertical feeder tube slide supports are subject to wear during up and down tube adjustments, which can impart a wobbling motion to the tube support system and thereby lead to undesired glass gob weight variation in a feeder bowl used in conjunction with a glass container forming machine of the individual section (I.S.) type. Also, from time to time, it is necessary to replace a feeder bowl itself. In the prior art, this required removal of the entire feeder tube mechanism itself.

BRIEF DESCRIPTION OF THE INVENTION

According to the present invention, the aforesaid and other problems associated with prior art glass forehearth feeder bowl feeder tube lift systems are avoided by a feeder tube lift system that employs a single, multiple shaft, servo motor operated, ball screw lift mechanism of sufficient capacity to sustain a cantilevered feeder tube support mechanism with minimal deflection. Such a lift mechanism involves no, or very little, backlash in its motions, thereby permitting precise control of the elevation of the lift tube in the feeder bowl, which is important in achieving accurate control of glass gob weight in an I.S. machine glass container manufacturing operation.

The feeder tube lift mechanism of the present invention is also capable of true isolated adjustments in a horizontal plane, both along X and Y axes, and it can be moved without slide wear, thereby avoiding introduction of wobbling motion to the tube support system. The servo motor powered ball screw lift mechanism of the present invention is lubricated by a lubricant that is recirculated with a closed system to ensure long life for bearings of the mechanism and the ball roller nut, and avoiding lubricant leakage and the need for lubricant replacement.

Accordingly, it is an object of the present invention to provide an improved lift mechanism for a feeder tube of a type employed in a glass forehearth feeder bowl. More particularly, it is an object of the present invention to provide a lift mechanism of the foregoing type that is not counterweighted, and thereby avoids the problems associated with the prior art, of counterweighted feeder tube lift mechanisms.

For further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 3:
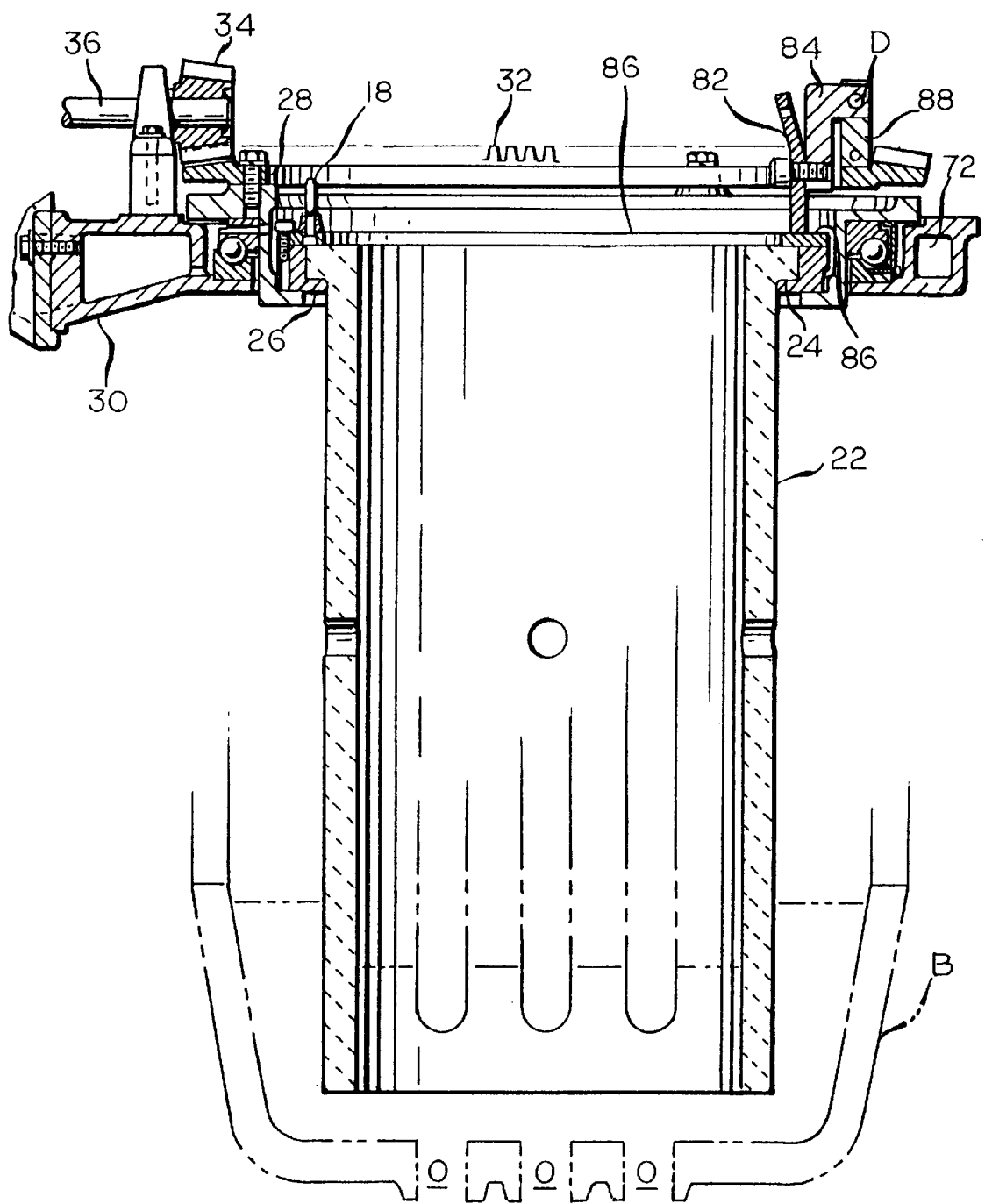
FIG. 3 is a sectional view taken on line 3—3 of FIG. 2.

A feeder tube assembly according to the preferred embodiment of the present invention is identified generally by reference numeral 20 in the drawing. The feeder tube assembly 20 includes a refractory feeder tube 22 which, as is shown in FIG. 3, is adapted to be inserted into a molten glass feeder bowl B at the outlet end of a generally horizontally extending molten glass cooling forehearth, otherwise not shown, which may be of conventional construction. The feeder tube 22 is vertically oriented in the feeder tube assembly, and its lowermost end is positioned slightly above the inside surface of the feeder bowl B, to thereby allow molten glass to flow through the space below the feeder tube 22 to exit through openings O at the bottom of the feeder bowl B.

The feeder tube 22 has an outwardly projecting flange 24 at its upper end, and the flange 24 is clamped in a clamping ring subassembly 86, which is provided with lifting eyes 18 and serves to support the feeder tube 22 on an inwardly projecting flange 26 of a rotatable ring subassembly 28. The rotatable ring subassembly 28 is cantilevered at the end of a support arm 30, and the subassembly 28 includes an upwardly facing ring gear 32, and is caused to rotate slowly with respect to the support arm 30 by the engagement of the ring gear 32 by a driven pinion 34 at an end of a driven rod 36, which is driven by a motor 38 acting through a speed reducer 40, all of which are supported on the support arm 32 at an end opposed to the end on which the feeder tube 22 is suspended. The rotation of the feeder tube 22 helps to properly mix the molten glass in the feeder bowl B to thereby ensure proper homogeneity and temperature uniformity of the molten glass exiting through the openings O.

The support arm 30 is supported along a vertically extending axis A that extends through a handle 42, which serves to lock the support arm in a non-adjustable and a non-pivotable position as will be hereinafter described more fully. The support arm 30 is also adjustably supported for precisely controllable motion along the axis A on a vertically extending servo motor powered precision linear actuator 44, a cylinder portion 44a of which is secured to the framework 46 of the feeder tube assembly 20. The linear actuator 44 is of a type that is available from E-Drive Design, Inc. of Glastonbury, Conn. under the product designation Model EA2S-7.312-L/D-1836, and will be subsequently described in greater detail. The support arm 30 has an opening 48 extending therethrough concentric with the axis A and generally concentric with the longitudinal central axis of the linear actuator 44. A spaced apart plurality of rods 50 extend outwardly and upwardly from the linear actuator 44 and are caused to reciprocate in unison along vertical axes by the actuation of the linear actuator 44. The rods 50 are non-rotatably received in a block 52 of a composite adjustment mechanism 54, which is supported on an inverted cup-shaped structure 56 that is secured to the upper surface of the support arm 30.

The adjustment mechanism 54 includes an upper plate 58, and the support arm 30 is moveable relative to the upper plate 58 along opposed spaced apart slot 60 in the structure 56, which extend generally parallel to the longitudinal axis of the support arm 30 to provide for precisely controllable adjustment of the support arm 30, and thereby of the feeder tube 22, in the X direction. To accomplish such adjustment, an adjusting screw 62, which is threadably received in the structure 56, has an inner end that engages the upper plate 58, and the turning of the adjustment screw 62 is effective to move the support arm 30 to or fro in the X direction relative to the adjustment mechanism 54, whose position in an horizontal plane is fixed by virtue of the attachment of the linear actuator 44 to the framework 46, as described.

The adjustment mechanism 54 also includes a lower plate 64, and the support arm 30 is moveable relative to the lower plate 64 along opposed, spaced apart slots 66 in the cup-shaped structure 56, which extend transversely of the longitudinal axis of the support arm 30, to provide for precisely controllable adjustment of the support arm 30, and thereby of the feeder tube 22, in the Y direction. To accomplish such adjustment, an adjustment screw 68, which is threadably received in an extension of the upper plate 58, has an inner end that engages a boss portion 70 of the cup-shaped structure 56, and turning of the adjustment screw 68 moves the support arm to or fro in the Y direction relative to the adjustment mechanism 54. Of course, when the handle 42 is tightened down against the boss 70, the support arm 30 will be frictionally prevented from moving relative to the adjustment mechanism 54, either in the X direction or the Y direction.

Because of the high temperature environment in which the feeder tube 22 is used, it is important to cool the end of the support arm 30 from which the feeder tube 22 is suspended. To that end, an annular passage 72 is provided in the support arm 30 surrounding and extending generally concentrically of the feeder tube 22, and cooling air or other cooling fluid is caused to flow through the passage 72 from inlet and outlet lines 74, 76, respectively. Further, a generally semi-cylindrical heat shield 78 is suspended form the support arm 30 at a location partly surrounding the upper end of the linear actuator 44, and between the linear actuator 44 and the feeder tube 22, to retard heating of the linear actuator 44 by heat radiated from the feeder bowl B.

Figure 2:
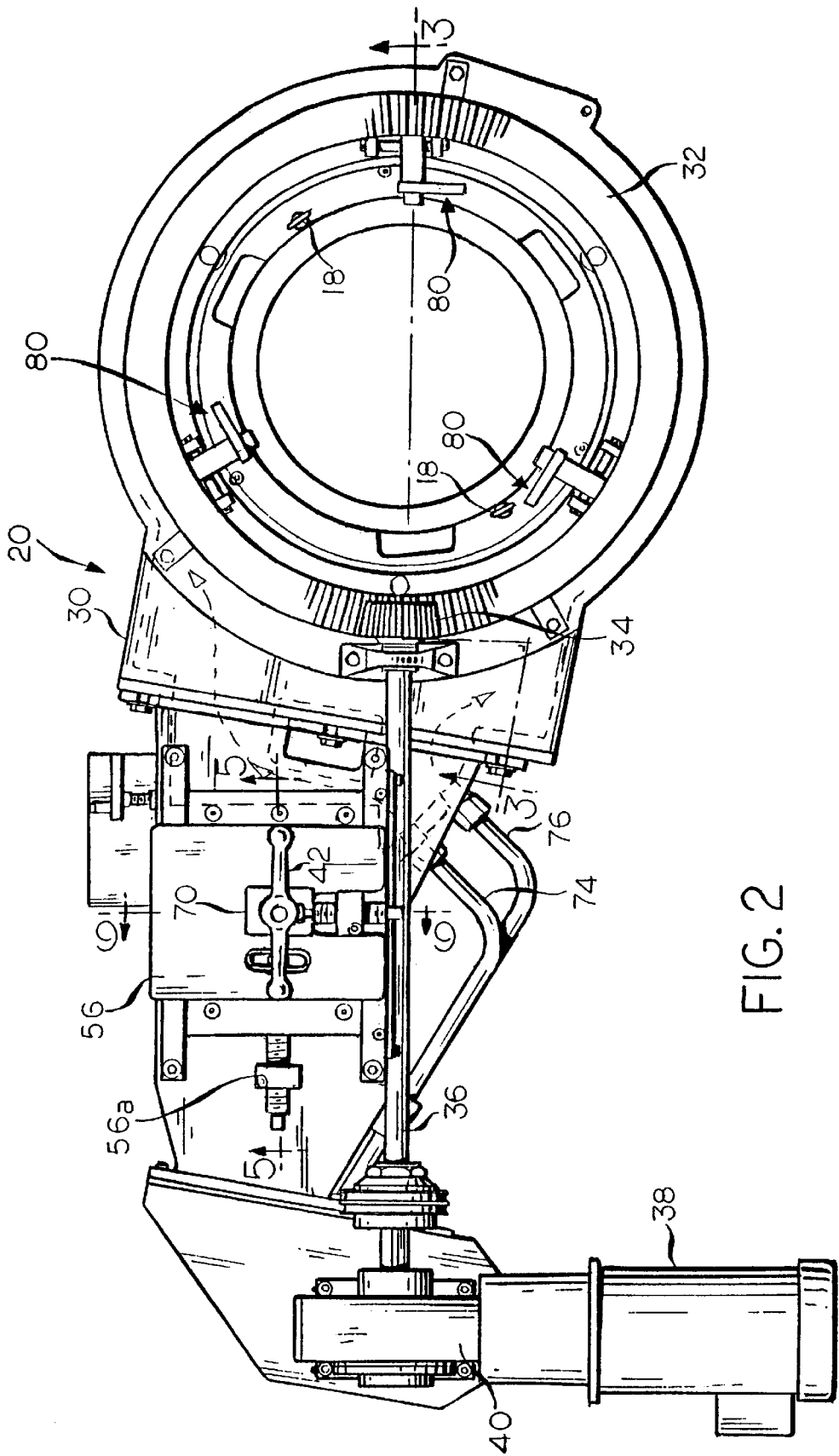
FIG. 2 is a plan view of the feeder tube assembly of FIG. 1.

The flange 24 of the feeder tube 22 is securely, but releasably, held in engagement with the flange 26 by a plurality of circumferentially spaced apart latch mechanisms, each generally identified by reference numeral 80, three such latch mechanisms being shown in FIG. 2. Each latch mechanism 80 comprises a lever 82 with a handle portion 82a at an end thereof and an enlarged cam portion 82b at an opposed end. The lever 82 is pivotably connected to a support member 84 about an axis C and, when the lever extends vertically, the cam portion 82b securely engages and upper surface of the clamping ring 86 which engages the flange 24 of the feeder tube 22 to forcibly press the flange 24 into its desired operating position. When the lever 82 is pivoted to a horizontal orientation, the cam portion 82b no longer engages the ring 86. In this position, the feeder tube 22 may be removed from the feeder bowl B by a simple lifting motion, using the lifting eyes 18 each of the latch mechanisms 80 being moveable out of alignment with the feeder tube 22 by pivotably connecting the support member 84 to a fixed structure 88 about an axis D. Before installing a new feeder tube 20, the support arm 30 should be elevated so that the new feeder tube 20 does not contact the feeder bowl B.

The pivoting of the support arm 30 about the axis A is done when it is desired to replace a feeder bowl B. After releasing the feeder tube 22 from its engaged position by the release of the latch mechanisms 80, as heretofore described, and after the actuation of the linear actuator 44 to lift the support arm 30 to an elevation such that the bottom of the feeder tube 22 is free of the feeder bowl B, the feeder tube 22 is then hoisted from the subassembly 28. To this end; the upper plate 58 of the adjustment mechanism 54 is pivotable with respect to the lower plate 64, after removal of an alignment pin 114 that circumferencially aligns the upper plate 58, the lower plate 64 and the block 52 with respect to one another during the operation of the feeder tube assembly 20.

Figure 8:
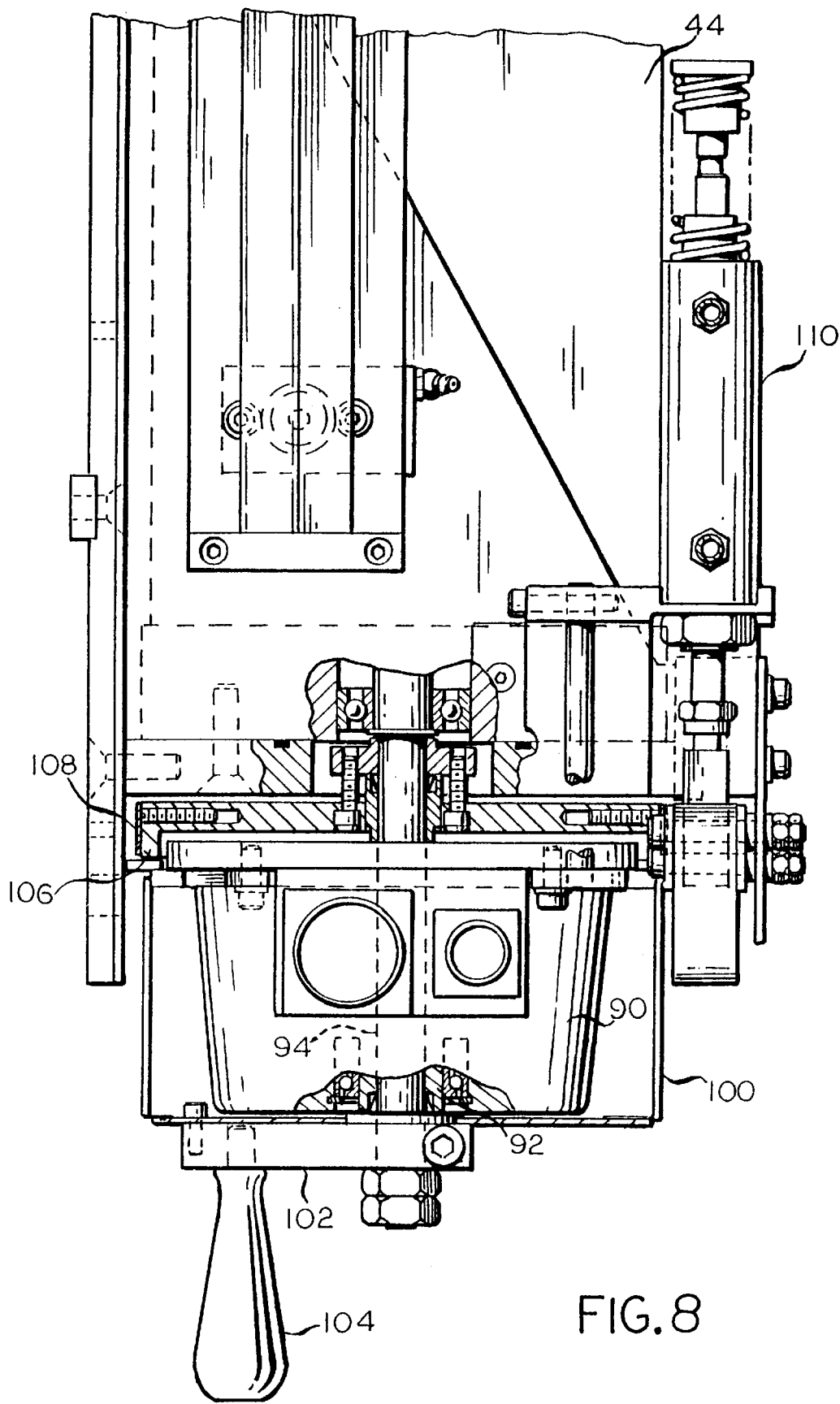
FIG. 8 is a fragmentary elevational view, partly in cross section, of a portion of the feeder tube assembly of FIGS. 1–6.
Figure 9:
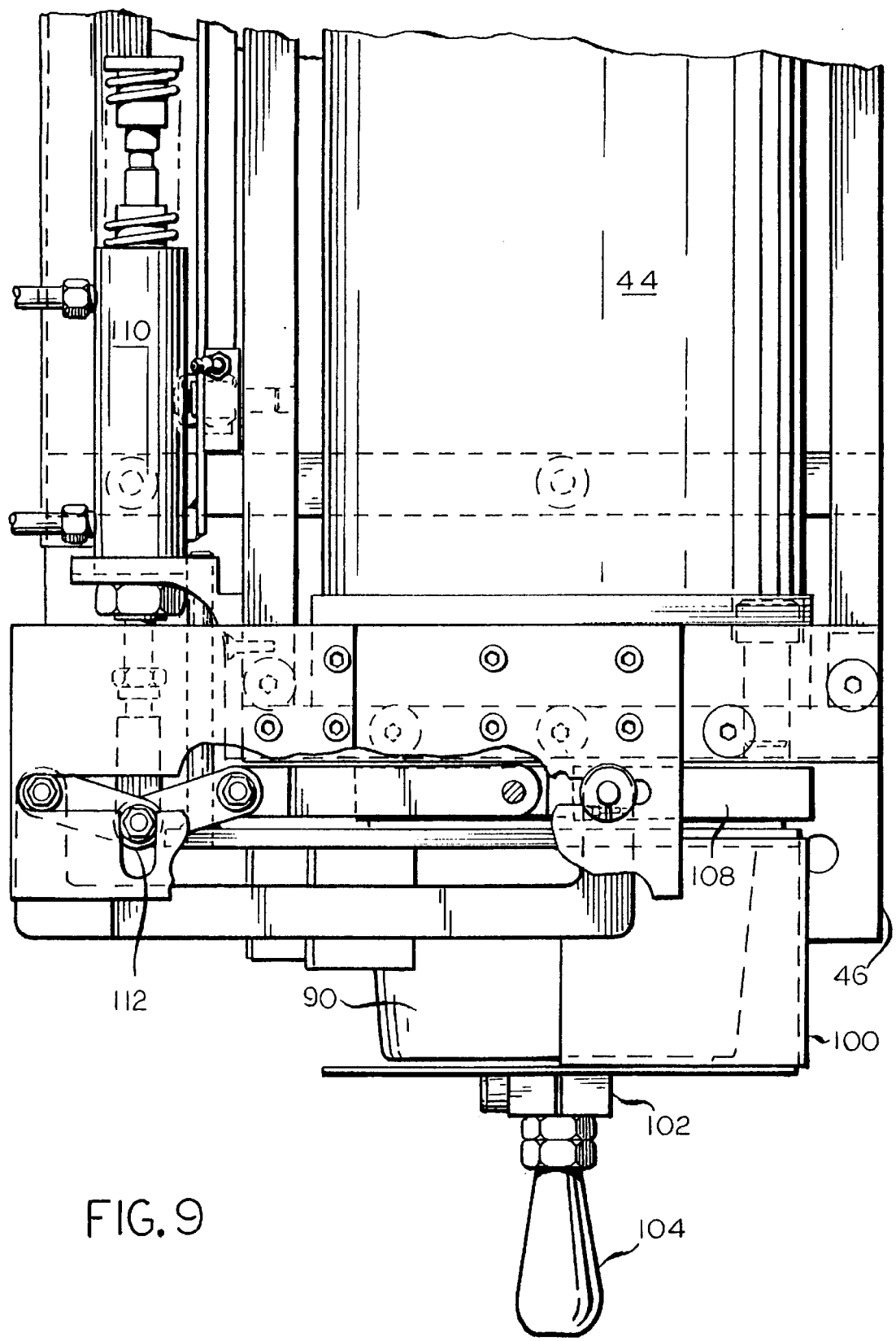
FIG. 9 is a view similar to FIG. 8 at a right angle thereto.
Figure 10:
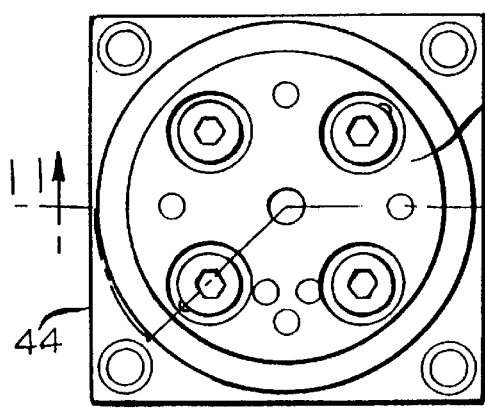
FIG. 10 is a plan view of an element of the feeder tube assembly of FIGS. 1–6.
Figure 11:
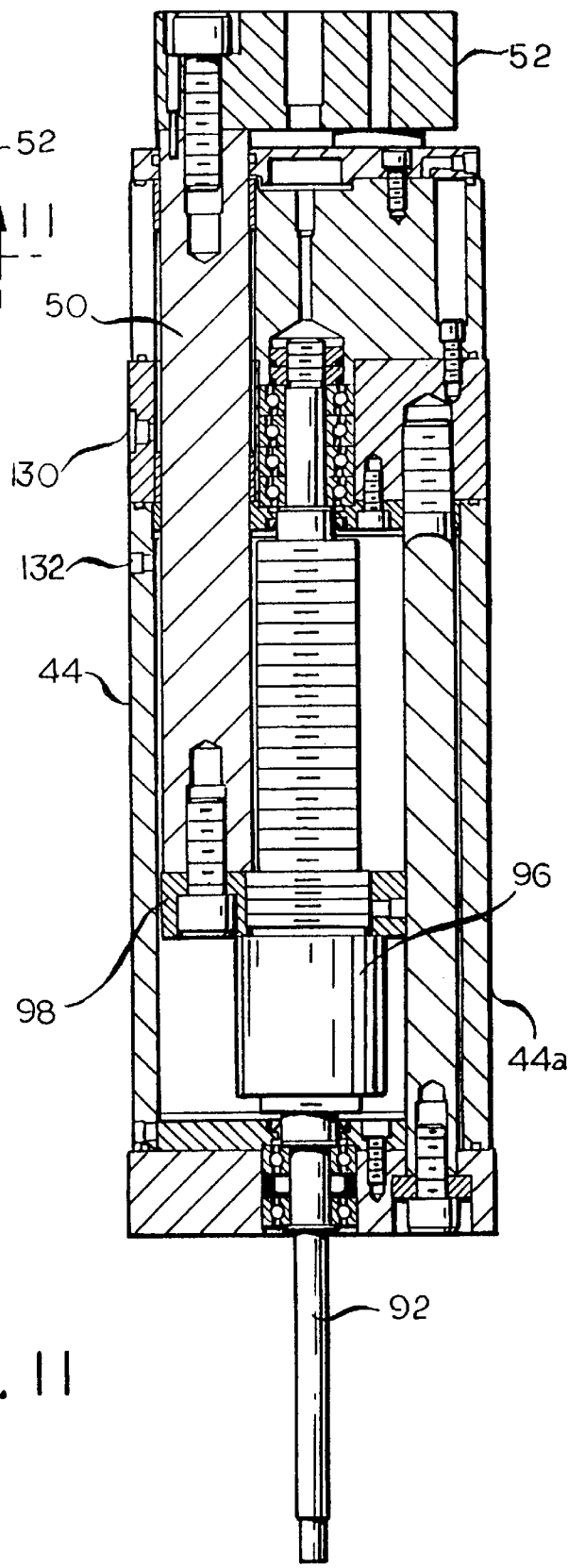
FIG. 11 is a sectional view taken on line 11—11 of FIG. 10.

The linear actuator 44 is powered by an a.c. servo motor 90, which is co-axially connected to the actuator 44, though it is contemplated that the connection can be by way of parallel axes with a V-belt or other drive extending therebetween. In any case, an assembly including the actuator 44 and the servo motor 90 is available from E-Drive Design of Glastonbury, Conn., as heretofore described. As is shown in FIG. 8, the motor 90 has a hollow output shaft 92. The hollow output shaft of the motor 90 is slipped onto an input shaft 94 of the linear actuator 44 (FIGS. 8 and 11), which has an internal ball screw drive 96. The ball screw drive 96 translates rotary motion of the shaft 92 into linear motion of an annular member 98, either to or fro depending on the direction of rotation of the shaft 92.

The annular member 98 may be manually positioned by turning a lever 102, which is fixed to the shaft 92. The shaft 92 extends to a level below the motor 90, actually below the level of an arcuate heat shield 100 that protects the motor 90 from thermal radiation from the feeder bowl B, and the lever 102 extends outwardly from the shaft 92. The lever 102 has a handle 104 projecting downwardly therefrom, at a location radially outwardly of the shaft 92, and the shaft 92 may be turned by manually engaging the handle 104 and using it to turn the lever 102.

Figure 12:
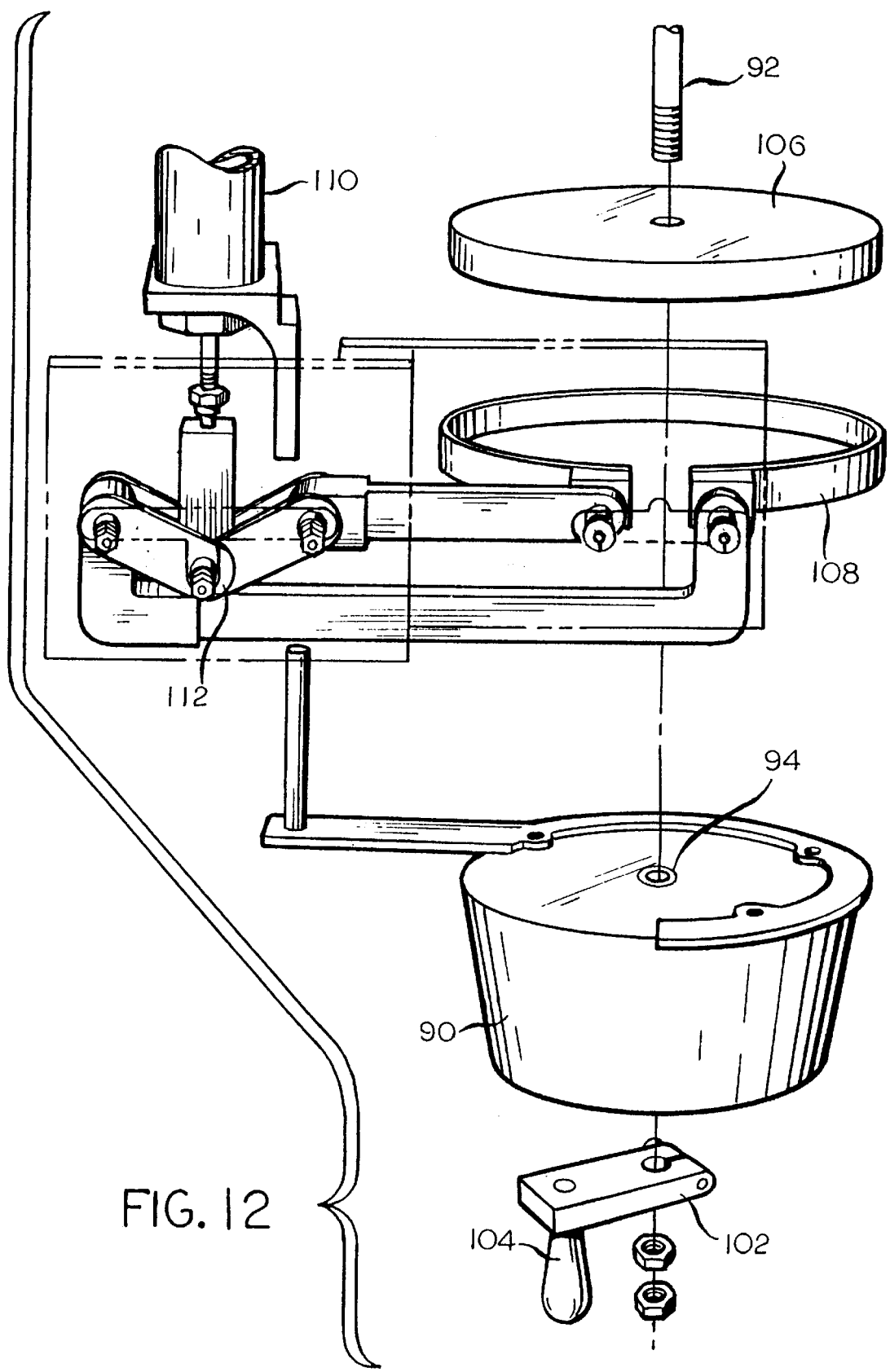
FIG. 12 is an exploded, perspective view of a portion of the apparatus illustrated in FIGS. 8 and 9.

The motor 90 is provided with an annular brake 106 that rotates with the shaft 92, and the brake 106 is selectively engageable by a double-ended constricting band 108. The band 108, when in its non-constricting mode, does not engage the brake 106 and provides no braking effect in such mode. However, the band 108 can be selectively tightened by the actuation of a pneumatic cylinder 110 acting through a linkage system 112, and, when the cylinder 110 is retracted, as shown in FIG. 12, the band 108 will be constricted to engage the brake 106, thus retarding turning action of the shaft 92, 94 and thereby locking the platform 30 in a desired elevation.

Figure 1:
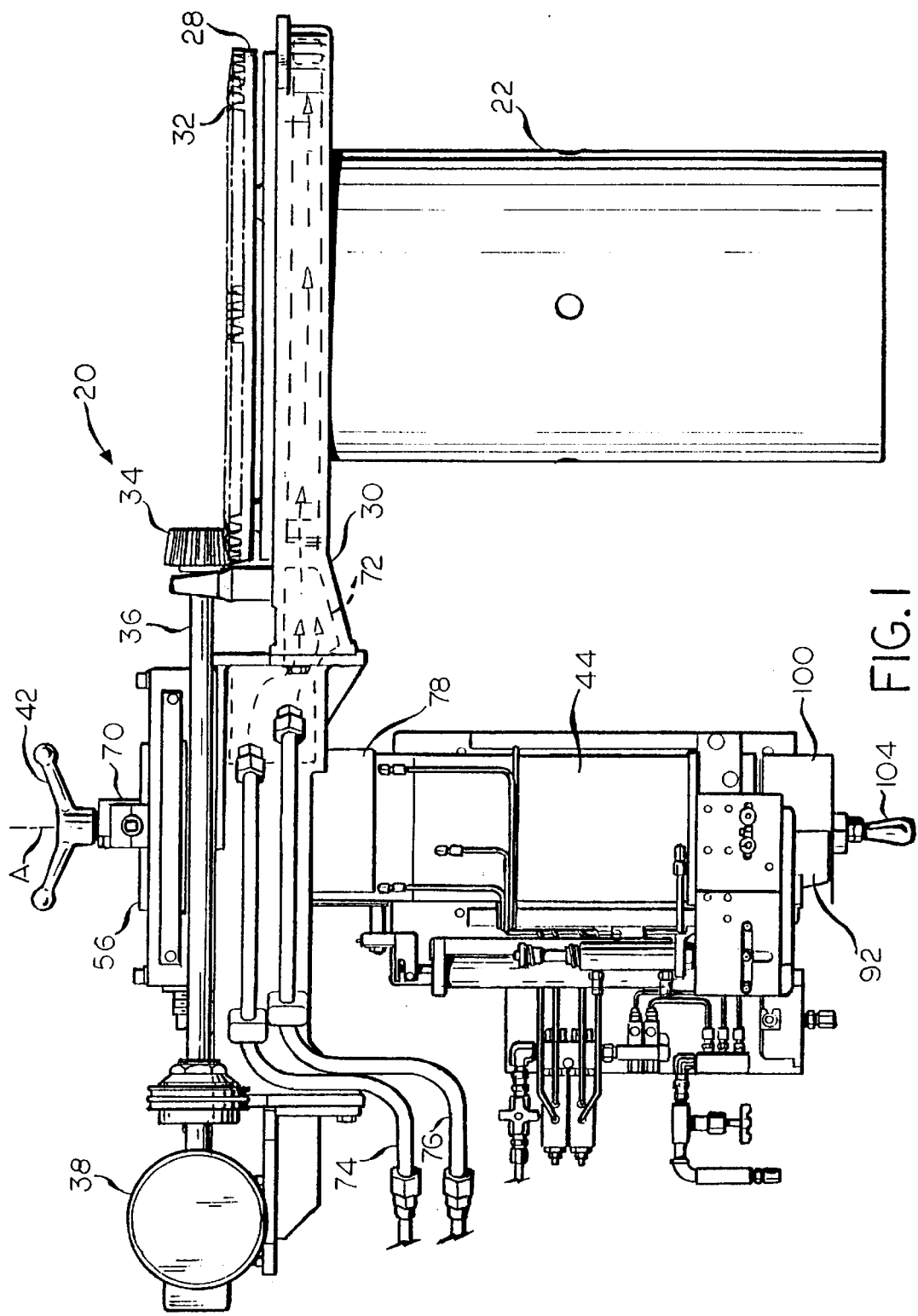
FIG. 1 is a fragmentary elevational view of a feeder tube assembly according to the preferred embodiment of the present invention.
Figure 4:
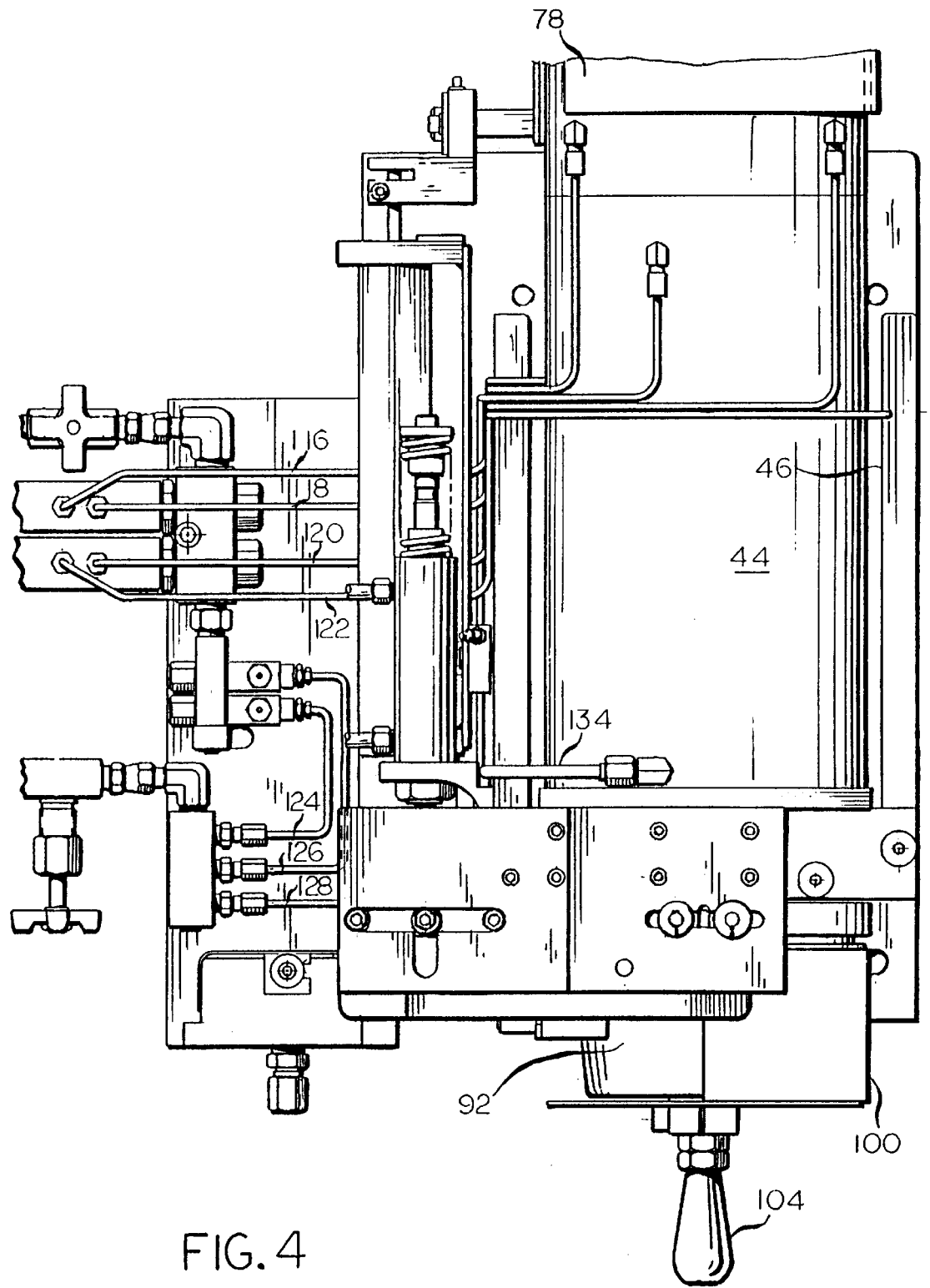
FIG. 4 is a fragmentary view, at an enlarged scale, of a portion of the feeder tube assembly shown in FIG. 1.
Figure 5:
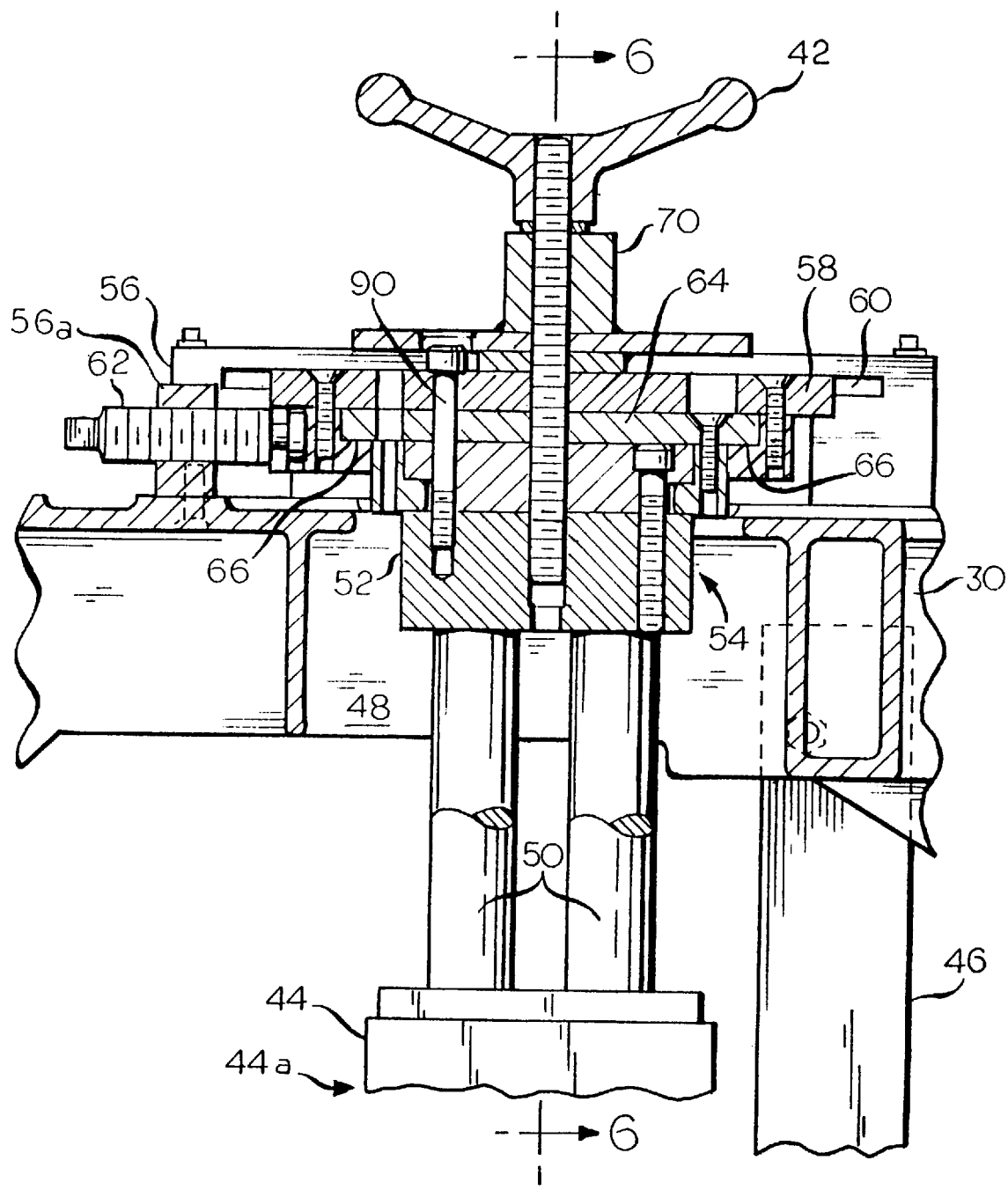
FIG. 5 is a fragmentary sectional view taken on line 5—5 of FIG. 2.
Figure 6:
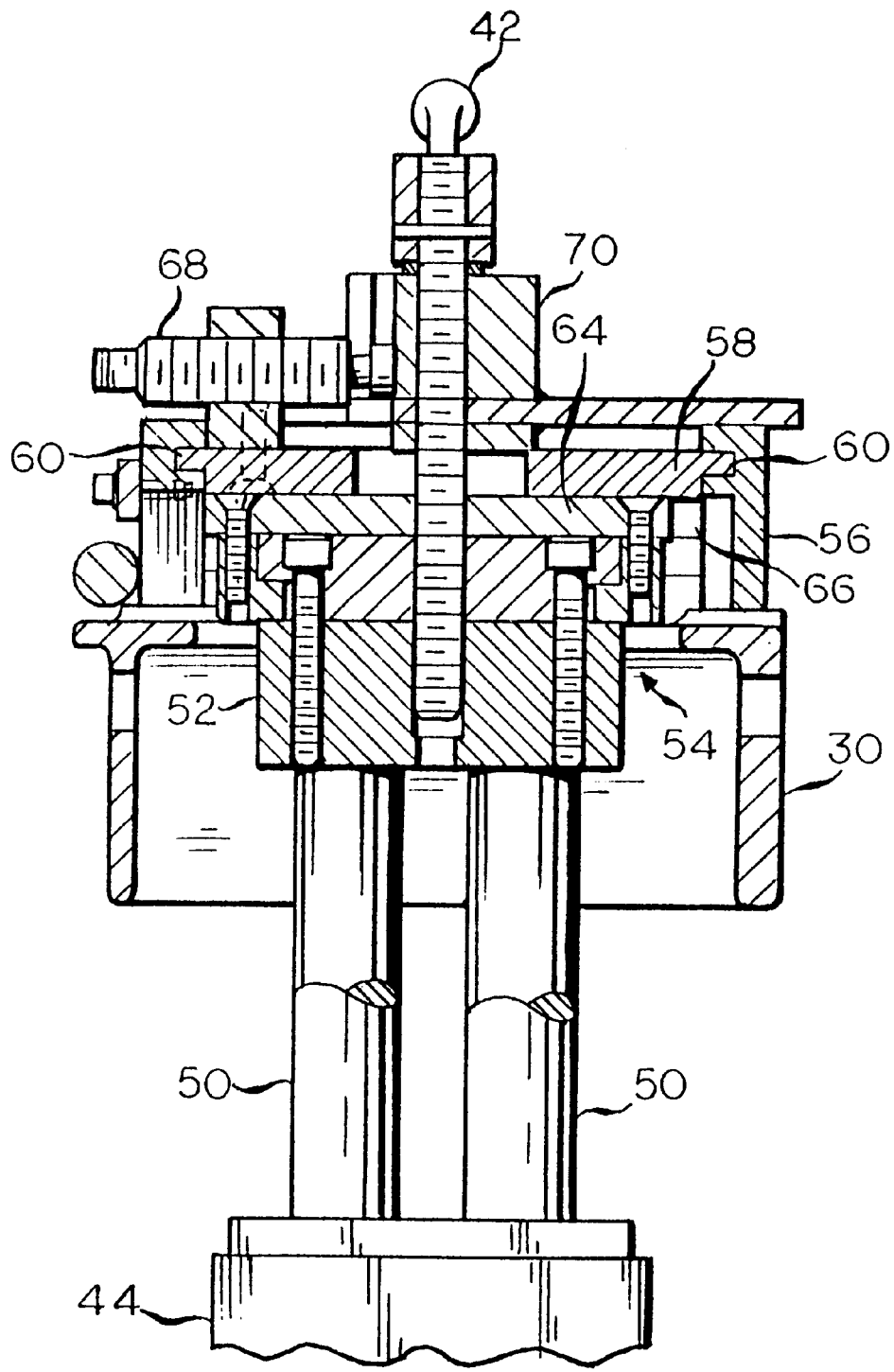
FIG. 6 is a sectional view taken on line 6—6 of FIG. 5.
Figure 7:
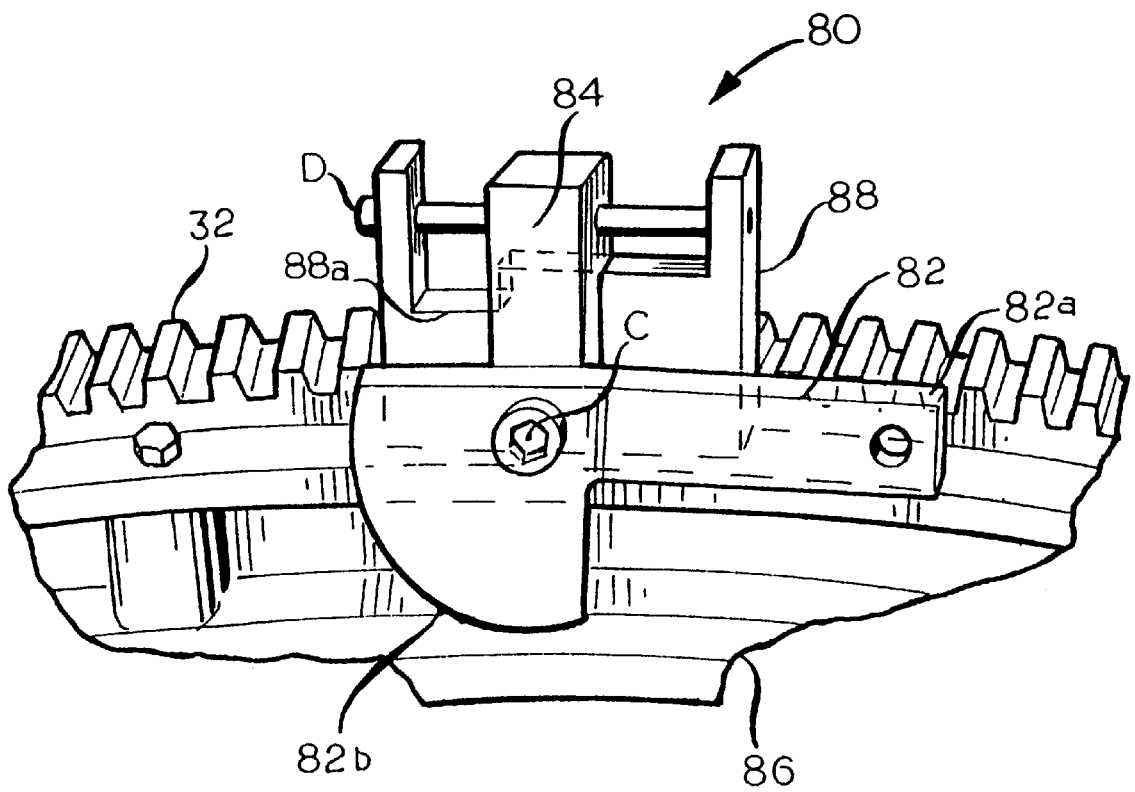
FIG. 7 is a fragmentary perspective view of a portion of the feeder tube assembly of FIGS. 1–6.

The linear actuator 44 requires constant lubrication in service, and to that end a plurality of lubricating oil inlet lines 116, 118, 120, 122, 124, 126 and 128 (FIG. 4) to deliver lubricating oil from a common source (not shown) to various locations of the linear actuator 44. These locations include inlets 130, 132 (FIG. 1) of the cylinder 44a of the linear actuator 44 and each of the four (4) rods 50 (FIG. 6) that extend therefrom. The lubricating oil is collected at the bottom of the cylinder 44a and returned to the source for recycling, by way of a return line 134 (FIG. 4) preferably after being filtered and cooled if necessary, with a supply of fresh, make-up oil being provided to make up for any oil losses in the system. The lubricating system, as described, is a closed system that provides adequate lubrication for all moving surfaces while simultaneously minimizing lubricant losses in a hot and relatively inaccessible environment and serving to conserve a produce derived from expensive and irreplaceable natural resources.

Although the best mode contemplated by the inventors' for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A feeder tube assembly for a feeder bowl of a glass melting furnace forehearth, said feeder tube assembly comprising:

a generally horizontally extending elongate support arm having an opposed pair of ends;

a generally vertically extending feeder tube;

means carried by said support arm for releasably securing said feeder tube to said support arm at a location adjacent an end of said support arm;

a generally vertically extending servo motor actuated linear actuator supporting said support arm at a location between said opposed ends, said servo motor actuated linear actuator being operable to adjust the elevation of said support arm;

wherein said feeder tube comprises a radially outwardly projecting flange at an upper end thereof; and clamping means for releasable acting against said outwardly projecting flange to releasably secure said feeder tube in the feeder bowl of the glass melting furnace;

wherein said clamping means comprises:

a clamping ring positioned above said outwardly projecting flange, said clamping ring being adapted to act against said outwardly projecting flange; and a plurality of circumferentially spaced apart latch mechanisms, each of said latch mechanisms being adapted to act against said clamping ring and further being adapted to be pivoted out of alignment with said clamping ring and said feeder tube to permit said feeder tube to be removed from the feeder bowl.

2. A feeder tube assembly according to claim 1 wherein each of said plurality of latch mechanisms comprises:

a lever having a handle portion and a cam portion with a rounded cam surface, said handle portion extending outwardly from said cam portion away from said rounded cam surface;

a support member, said lever being pivotally connected to said support member at a location near an end of said support member; and a fixed member, said support member being pivotally connected, near an opposed end of said support member, to said fixed member;

pivoting of said support member with respect to said fixed member being effective to swing said lever out of interfering contact with the clamping ring.

3. A feeder tube assembly according to claim 1 and further comprising;

means carried by said support arm for rotating said feeder tube relative to said support arm about a longitudinal central axis of said feeder tube.

4. A feeder tube assembly according to claim 1 wherein;

said support arm has an opening positioned between its opposed ends, said opening being vertically aligned with a longitudinal central axis of said linear actuator, said support arm being rotatable with respect to said linear actuator about said longitudinal central axis of said linear actuator.

5. A feeder tube assembly according to claim 4 and further comprising;
   means for adjusting the position of said support arm relative to said linear actuator along an axis extending longitudinally of said support arm.

6. A feeder tube assembly according to claim 5 and further comprising;
   means for adjusting the position of said support arm relative to said linear actuator along an axis extending transversely of said support arm.

7. A feeder tube assembly according to claim 1 wherein; said generally vertically extending servo motor actuated linear actuator comprises a ball screw mechanism for translating rotary motion of an output shaft of said servo motor to linear motion.

8. A feeder tube assembly according to claim 7 wherein; said generally vertically extending servo motor actuated linear actuator further comprises means for releasably braking said servo motor against rotation.

9. A feeder tube assembly according to claim 1 wherein said support arm has an opening, said second opening of said support arm being vertically aligned with said feeder tube, and further comprising;
   means for cooling said support arm in an annular pattern at a location adjacent said opening.

10. A feeder tube assembly according to claim 7 wherein said linear actuator has a housing and a member at least partly contained within said housing and being moveable with respect to said housing between first and second positions as a result of rotary motion of said output shaft of said servo motor, and further comprising;
    a fixed support structure, said housing being fixedly secured to said fixed support structure.

11. A feeder tube assembly according to claim 10 wherein said linear actuator further comprises;
    a block;
    a space apart plurality of rods extending from said member of said linear actuator to said block; and
    means for tightening said support arm relative to said block for preventing rotation of said support arm relative to said linear actuator.

12. A feeder tube assembly according to claim 10 wherein said linear actuator has an input shaft, said input shaft of said linear actuator being integral with said output shaft of said servo motor, and further comprising;
    means for turning said input shaft of said linear actuator and said output shaft of said servo motor independently of operation of said servo motor.

13. A feeder tube assembly according to claim 3 wherein said means for rotating said feeder tube comprises;
    a ring gear assembly generally concentrically positioned with respect to said feeder tube, said ring gear being non rotatable with respect to said feeder tube;
    a pinion gear engaging said ring gear; and
    means for imparting rotary motion to said pinion gear.

14. A feeder tube assembly according to claim 1 and further comprising:
    closed lubricating oil circulating means for continuously lubricating said servo motor actuated linear actuator.

15. A method of replacing a feeder bowl of a glass melting furnace forehearth installation, the feeder bowl having an installed position in the installation, the installation having a feeder tube assembly with a generally horizontally extending elongate support arm and a feeder tube rotatably secured to an end of the support arm and normally positioned with a lowermost end immersed in the feeder bowl, the method comprising:
    lifting the support arm until the lowermost end of the feeder tube is above the feeder bowl;
    pivoting the support arm about an axis spaced from the feeder tube until the feeder tube is no longer in vertical alignment with the feeder bowl; and
    then lifting the feeder bowl from its installed position without otherwise removing, the support arm.

16. A latch mechanism for releasably securing a clamping ring to a flange of a feeder tube in a glass melting furnace forehearth installation, said latch mechanism comprising:
    a lever having a handle portion and a cam portion with a rounded cam surface, said handle portion extending outwardly from said cam portion away from said rounded cam surface;
    a support member, said lever being pivotally connected to said support member at a location near an end of said support member; and
    a fixed member, said support member being pivotally connected, near an opposed end of said support member, to said fixed member;
    pivoting of said support member with respect to said fixed member being effective to swing said lever out of interfering contact with the clamping ring.

17. A latch mechanism according to claim 16 wherein said handle portion extends outwardly from said camp portion at a location at an end of said cam portion.

18. In combination with a clamping ring of a type used to engage a flange of a feeder tube in a glass melting furnace forehearth installation, said clamping ring having an upper surface, a latch mechanism for releasably engaging said upper surface of said clamping ring, said latch mechanism comprising:
    a lever having a handle portion and a cam portion with a rounded cam surface, said handle portion extending outwardly from said can portion away from said rounded cam surface;
    a support member, said lever being pivotally connected to said support member at a location near an end of said support member; and
    a fixed member, said support member being pivotally connected to said support member, at a location near an opposed end of said support member, to said fixed member;
    pivoting of said support member with respect to said fixed member being effective to swing said lever out of interfering contact with the clamping ring to permit the clamping ring to be lifted out of engagement with the flange of the feeder tube.

19. A latch mechanism according to claim 18 wherein said handle portion extends outwardly from said handle portion at a location at an end of said cam portion.

* * * * *